United States Patent
Wang et al.

(10) Patent No.: US 12,111,491 B2
(45) Date of Patent: Oct. 8, 2024

(54) SINGLE-CORE POLARIZATION-MAINTAINING DISPERSION COMPENSATION MICRO-STRUCTURED OPTICAL FIBER

(71) Applicant: Yanshan University, Qinhuangdao (CN)

(72) Inventors: Wei Wang, Qinhuangdao (CN); Xiaochen Kang, Qinhuangdao (CN); Chang Zhao, Qinhuangdao (CN); Hongda Yang, Qinhuangdao (CN); Wenchao Li, Qinhuangdao (CN); Man Yang, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 18/476,307

(22) Filed: Sep. 28, 2023

(65) Prior Publication Data
US 2024/0019631 A1 Jan. 18, 2024

Related U.S. Application Data

(63) Continuation of application No. PCT/CN2022/104937, filed on Jul. 11, 2022.

(30) Foreign Application Priority Data
Aug. 23, 2021 (CN) .......................... 202110969178.7

(51) Int. Cl.
*G02B 6/02* (2006.01)
*G02B 6/024* (2006.01)

(52) U.S. Cl.
CPC ..... *G02B 6/02333* (2013.01); *G02B 6/02285* (2013.01); *G02B 6/02342* (2013.01);
(Continued)

(58) Field of Classification Search
CPC ............ G02B 6/02252; G02B 6/02285; G02B 6/02333; G02B 6/02342; G02B 6/02352;
(Continued)

(56) References Cited

U.S. PATENT DOCUMENTS 7,551,819 B2 * 6/2009 Dangui .............. G02B 6/02338
385/127
7,813,387 B2 10/2010 Pedersen et al.
(Continued)

FOREIGN PATENT DOCUMENTS

CN 113671620 A 11/2021

OTHER PUBLICATIONS

Internation Search Report of PCT/CN2022/104937,Mailed Sep. 29, 2021.

*Primary Examiner* — Ryan A Lepisto
(74) *Attorney, Agent, or Firm* — True Shepherd LLC; Andrew C. Cheng

(57) ABSTRACT

A single-core polarization-maintaining dispersion compensation micro-structured optical fiber comprises a fiber core, a first layer of air holes surrounding the fiber core, the cladding defects on the x-axis, the cladding defects on the y-axis, and the cladding. The air holes in the fiber cross section are arranged in the equilateral triangle lattice. Three consecutive air holes are omitted to form a solid area. This solid area is the fiber core. There are two cladding defects along the x-axis. Their centers are respectively located at the two vertices of the hexagon on the x-axis, which is formed by the fourth air hole ring from the core exclusive the central air hole. Each cladding defect along the x-axis contains 7 air holes and goes through from the core by only 1 layer of air holes. There are also two cladding defects along the y-axis.

6 Claims, 4 Drawing Sheets

(52) U.S. Cl.
CPC ..... *G02B 6/02352* (2013.01); *G02B 6/02357* (2013.01); *G02B 6/02361* (2013.01); *G02B 6/024* (2013.01); *G02B 6/02252* (2013.01); *G02B 6/02366* (2013.01)

(58) Field of Classification Search
CPC . G02B 6/02361; G02B 6/02366; G02B 6/024
See application file for complete search history.

(56) References Cited

U.S. PATENT DOCUMENTS

| | | | |
|---|---|---|---|
| 7,924,500 B1 | 4/2011 | Minelly | |
| 8,958,676 B2 * | 2/2015 | Geernaert | G01D 5/35316 385/125 |
| 9,140,873 B2 | 9/2015 | Minelly | |
| 9,158,065 B2 * | 10/2015 | Fini | G02B 6/02357 |
| 9,658,393 B2 * | 5/2017 | Digiovanni | G02B 6/032 |
| 10,261,245 B2 * | 4/2019 | Sulejmani | G02B 6/02109 |
| 10,466,278 B2 * | 11/2019 | Müller | G02B 6/02333 |
| 11,163,109 B2 * | 11/2021 | Yoo | C03B 37/01222 |
| 11,391,886 B2 * | 7/2022 | Chenard | C03B 37/0279 |
| 11,598,915 B2 * | 3/2023 | Zhang | G02B 6/02338 |
| 2005/0084223 A1 * | 4/2005 | Tanaka | G02B 6/02333 385/125 |
| 2010/0254669 A1 * | 10/2010 | Takenaga | G02B 6/0238 385/123 |
| 2023/0204855 A1 * | 6/2023 | Wang | G02B 6/02357 385/126 |

\* cited by examiner

SINGLE-CORE POLARIZATION-MAINTAINING DISPERSION COMPENSATION MICRO-STRUCTURED OPTICAL FIBER

CROSS-REFERENCE TO RELATED APPLICATIONS

This application is a continuation of International Patent Application No. PCT/CN2022/104937 with a filing date of Jul. 11, 2022, designating the United States, now pending, and further claims priority to Chinese Patent Application No. 202110969178.7 with a filing date of Aug. 23, 2021. The content of the aforementioned applications, including any intervening amendments thereto, are incorporated herein by reference.

TECHNICAL FIELD

The invention relates to the technical field of microstructure fiber communication, in particular to a single-core polarization-maintaining dispersion compensation microstructured optical fiber.

BACKGROUND OF THE PRESENT INVENTION

Optical fiber is currently widely used to transmit the signal in the fields of telecommunications, electric power, broadcasting and other areas. A fiber that has both the polarization maintaining property and dispersion compensation property in one fiber, not only maintains the polarization of the optical signal, but also compensates for the accumulated positive dispersion in this linear polarized direction. The harmful effects of polarized mode dispersion and chromatic dispersion can be simultaneously eliminated. Therefore, this kind of fiber has huge potential in high-speed optical communication system.

Microstructure fiber (MSF) is also called photonic crystal fiber. By flexible design of their structure, many MSFs with both polarization maintaining and dispersion compensation properties have been designed. One class of the schemes is MSFs with coaxially dual-core structure with respect to z-axis. For example, Wang Wei and Yang Qihao et al., designed a polarization maintaining dispersion compensating MSF. In their design, the central air hole is omitted and the third layer of elliptical air holes is reduced to form the coaxial dual-core structure. All the elliptical air holes in the MSF's cross section are arranged in isosceles triangles lattice. By the combined actions of various mechanisms to adjust the modal refractive indices, the birefringence in this MSF's outer and the inner core has the same direction. Besides, the birefringence in the outer core and the inner core has similar value. Those characteristics guarantee the MSF has the polarization maintaining property. At the same time, both the polarized directions of the inner core can be used to compensate the accumulated dispersion at 1550 nm (Wang Wei, Yang Qihao, etc. A polarization maintaining dispersion compensation microstructure fiber, China, CN201911121696.2, [P]. 2020-02-14). Another example is a polarization maintaining dispersion compensating MSF designed by Wang Wei and Zhou Fandi et al. In this design, the air holes in the inner and outer core regions are filled with liquid crystal. When the liquid crystal rotates at 0° (or 90°), the refractive index curves of the x-polarized mode (or y-polarized mode) in the inner and outer core regions intersect at around 1550 nm. This enables the light energy in the inner core and outer core regions couple with each other, which further results in an abrupt change around the intersection point in the refractive index of the x-polarized mode (or y-polarized mode) with wavelength curve. As a result, large negative dispersion can be generated in the corresponding polarized mode. The polarization direction of the MSF can be controlled by the direction of the liquid crystal (Wang Wei, Zhou Fandi, et al, A polarization-maintaining dispersion compensation microstructure fiber: China, CN201911207733.1, [P]. 2020-03-13). In all the above schemes, they explicitly state that the mechanism of coupling between the modes in inner core and the outer ring core is used. With the huge difference between the slopes of the curves of the inner and outer core modes' refractive indices with wavelength, if one adjusts the refractive index values of the inner and outer core modes to make them equal at one specific wavelength, then the curves of the inner and outer core modes' refractive indices with wavelength separate quickly at other wavelengths. This means strong coupling near the intersection point but weak coupling at any other wavelengths, which further results in a sudden change of the refractive index values of the inner and outer core mode only around the intersection point. This sudden change of the refractive index values means sudden change on the curve of refractive index with wavelength at the intersection point. This finally results in a large negative dispersion in the fibers to achieve the technical effect of compensating the signal's accumulated positive dispersion in conventional single mode fiber. Feng Chaoyin et al., also designed a coaxial dual-core MSF which has the high birefringence and high negative dispersion characteristics simultaneously. Because this MSF has two smaller air holes on both the left and right sides of the fiber core, the fiber has double rotational symmetry and birefringence is generated in the inner core mode. In their paper, Feng Chaoyin et al, studied how to control the dispersion characteristics by the fiber structure parameters. However, they did not mention whether there is coupling between the inner and outer cores' mode. (Feng Chaoyin, Wang Jixian. Analysis the characteristics of a new type of high birefringence photonic crystal fiber, [J]. Optical Communication Research, 2014, 40(1): 41-44.). Another commonly used MSF scheme is also the multi-core structure, while the multiple cores are not distributed coaxially (on the same z-axis). For example, Wang Wei and Yang Man et al., designed a polarization maintaining dispersion compensating MSF. They ignored two air holes in y direction to form the inner core, and shrunk the two air holes in x direction to form the outer core. By these methods, they made the fast and slow axes of the inner and outer cores in opposite directions. Together with a variety of technical methods, the technical effect of dispersion compensation characteristics in the x-polarized mode can be achieved. (Wang Wei, Yang Man, etc. A polarization maintaining dispersion compensation microstructure fiber: China, CN202110769340.0, [P].)

In order to realize solely the dispersion compensation property or polarization maintaining property, various types of MSF have also been invented. To dispersion compensating MSFs, the coaxial dual-core structures is constructed, then a large negative dispersion near the resonance point is achieved by the mechanism of inner and outer core modes' coupling. For examples, F. Gérôme et al, Zhao Xingtao et al, and Zhang Ya-Ni respectively proposed dispersion compensating MSFs for the communication band using this structure. (Gérôme F, Auguste J L, Blondy J M. Design of dispersion-compensating fibers based on a dual-concentric-core photonic crystal fiber, [J]. Optics letters, 2004, 29(23).

Zhao Xingtao, Zhou Guiyao, Li Shuguang, Liu Zhaolun, Wei Dongbin, Hou Zhiyun, Hou Lantian. Photonic crystal fiber for dispersion compensation, [J]. Applied optics, 2008, 47(28). Zhang Ya-Ni. Design and optimization of low-loss low-nonlinear high negative-dispersion photonic crystal fiber, [J]. Acta Physica Sinica, 2012, 61(08): 261-267.) To polarization maintaining MSF (also called high birefringence MSF), the MSF with structural symmetry of C2v is constructed, then the x- and y-polarized components of the fundamental mode in the core are no longer degenerated (the real parts of the refractive indices of the x- and y-polarized mode are no longer equal). In one way, the air holes are arranged in regular hexagonal lattice (the air holes can be also regarded in the equilateral triangular lattice) with C6v symmetry. However, a quasi-rectangular fiber core is formed by omitting several adjacent air holes to reduce the overall symmetry of the fiber to C2v. For example, Lou Shu-Qin et al, and G. Statkiewicz et al, all constructed the quasi-rectangular fiber core by ignoring three consecutive air holes in x direction. The high birefringence was achieved by tunning the geometry of the fiber core. (Lou Shu-Qin, Ren Guo-Bin, Yan Feng-Ping, Jian Shui-Sheng. Dispersion and polarization properties of near-rectangle core photonic crystal fibers, [J]. Acta Physica Sinica, 2005(03): 1229-1234.) (G. Statkiewicz et al, Birefringent holey fiber with triple defect, [J]. IEEE, 2004, 1: 350-353).

On the basis of the polarization maintaining MSF, the outer cores, which can be also treated as the defects in the cladding, are further introduced into the cladding. Because of the mechanism of mode coupling, the loss of one of the polarized modes is increased, and this particular polarized mode is filtered out. By this method, the single-polarization single-mode MSF is achieved. For example, Tang Zihui proposed a single-polarization single-mode MSF, in which a lossless region is created by ignoring one air hole in the center, and a high-loss side-core region is created by ignoring three air holes on the positive x-axis. In his design, the refractive indices of the central and side cores have similar values, as well as the slopes of the curves of their refractive indices to wavelength. Because a higher birefringence of the side core broadens the operation bandwidth of single-polarization. In addition, a less difference between the slopes of refractive indices to wavelength curves of the central and side cores also broadens the operation bandwidth of single-polarization. As a result, the MSF that supports single-polarization single-mode transmission is realized. (Tang Zihui. Design of new birefringent photonic crystal fiber [D]. Nanjing University of Posts and Telecommunications, 2015.) Another example is a single-polarization single-mode MSF designed by Sun-Goo Lee et al., Two smaller air holes were introduced into the cladding to form the cladding defect. The x-polarized mode of the fiber core is coupled with the outer core mode, so that this unwanted x-polarized mode is suppressed. (Sun-Goo Lee, Sun Do Lim, Kwanil Lee, Sang Bae Lee, Single-polarization single-mode photonic crystal fiber based on index-matching coupling with a single silica material, [J]. Optical Fiber Technology, 2010, 17(1).)

Besides filtering out a particular polarized state of the fundamental mode to make the high-birefringence MSF single-polarization single-mode transmission, the outer cores or defects constructed in the cladding can also be used to filter out other higher order modes. For example, Tanmay Bhowmik et al., designed a broadband single-mode MSF. The smaller holes are introduced in the cladding to form three defect regions. The modes in the defects are adjusted to couple with the higher-order modes of the inner core. By this way, the higher order modes are suppressed and single-mode transmission is achieved. (Tanmay Bhowmik, Annesha Maity. Design and analysis of broadband single-mode photonic crystal fiber for transmission windows of the telecom wavelengths, [J]. Optik-International Journal for Light and Electron Optics, 2017, 139.) It is important to note that all the fibers mentioned in the two paragraphs above employ outer cores or defects in the cladding to filter out unwanted modes. To broaden the operational bandwidth, the refractive indices and the slopes of curves of refractive index with wavelength of the outer core mode and the filtered core mode are required as similar as possible.

SUMMARY OF PRESENT INVENTION

The purpose of this invention is to provide a kind of MSF, namely polarization maintaining dispersion compensation MSF. Both its x- and y-polarized core modes have negative dispersion with large absolute value at the same wavelength. Meanwhile, their linear polarized states can be maintained along the long and short axis during transmission at that specific wavelength. Because of these properties, the invented MSF can simultaneously compensate for the positive dispersion of the optical signal accumulated during the transmission in the front-end optical fiber and maintain the linear polarized state of the optical signal. In order to achieve the above technical effects, the technical scheme provided by this invention has simultaneously solved the following four technical problems:

(1) Generate high birefringence in the fiber core to maintain the linear polarized states of the lights within the core.

In this invention, omit 3 consecutive air holes along one of the edges of the hexagonal lattice to form a solid area, which forms the fiber core. (Hereinafter, set the center of the middle air hole of the 3 ignored air holes as the origin of the coordinate. Set the axis connecting all the centers of the 3 omitted air holes as the x-axis. Set the axis passing through the origin and perpendicular to the x-axis as the y-axis). Increase the diameter of the air holes in the first layer surrounding the core to be larger than the diameter of the air holes in the cladding. Reduce the distance between adjacent air holes. The three technical schemes above change the refractive index of the x- and y-polarized modes of the core. They may either increase or decrease the refractive index values of the x- and y-polarized modes. However, each technical scheme makes the refractive index value of the x-polarized mode higher than that of the y-polarized mode. Under the joint action of the three technical schemes, the refractive index value of the x-polarized mode is much higher than that of the y-polarized mode in the core. This generates a birefringence with slow axis along x direction and fast axis along y direction. In addition, all the above technical schemes change the slopes of the refractive index to the red-shift of wavelength curves for both x- and y-polarized modes in the core. They may either increase or decrease the absolute value of the slopes. However, each technical scheme makes the absolute value of the slope of the refractive index to the red-shift of wavelength curve for the x-polarized mode smaller than that for the y-polarized mode. Under the joint action of the three technical schemes, the absolute value of the slope of the refractive index to the red-shift of wavelength curve for the x-polarized mode becomes much smaller than that for the y-polarized mode.

In addition, this invention constructs 2 cladding defects with identical structure along the x-axis. They are symmetrically distributed with respect to the y-axis. The invention also constructs 2 cladding defects with identical structure along the y-axis and symmetrically distributed with respect to the x-axis. As a result, the MSF has a structural symmetry of C2v. Each cladding defect along the x-axis contains 7 smaller air holes and goes through from the core by only 1 layer of air holes. These technical schemes increase the refractive index value of the x-polarized core mode. Because the 2 cladding defects along the x-axis have identical structure and are symmetrically distributed with respect to the y-axis, they impose same effects on increasing the refractive index value of the core mode. The 2 cladding defects along the y-axis have identical structure and symmetrically distributed with respect to the x-axis. Each of them contains 1 smaller air hole. However, the shortest path from each of them to the core goes through at least 3 layers of air holes. Therefore, the 2 cladding defects along the y-axis has little effects on the refractive index value of the y-polarized mode in the core. All those combined actions above further increase the birefringence of the fiber core.

The above technical schemes generate high birefringence in the fiber core, with the refractive index of the x-polarized mode higher than that of the y-polarized mode. This guarantees the core with excellent polarization maintaining performance.

(2) The refractive index match wavelength for the cladding defects modes along x-axis and x-polarized core mode is similar to that for the cladding defects modes along y-axis and y-polarized core mode.

The goal of the invention is to generate negative dispersion with large absolute value in both x- and y-polarized core modes, by making them resonate and strongly couple between the corresponding modes in the cladding defects along the x and y axes. To achieve this goal, in addition to solve the technical problem stated in (1), it is necessary to make the refractive indices of the modes in cladding defects along the x and y axes equal to that of the corresponding x, y-polarized core modes around working wavelength. This can be also called refractive index match between the core modes and the corresponding cladding defect modes. This further requires that the refractive index in the cladding defect modes along the x-axis is much higher than that along the y-axis. This requirement increases the difficulty of the refractive index match between the cladding defect modes and the core polarized modes.

To fulfill those requirements, this invention constructs two different kinds of cladding defects along the x-axis and y-axis, respectively. There are 2 cladding defects along the x-axis. Their centers are respectively located at the two vertices of the fourth hexagonal air-hole ring on the x-axis. Both go through from the core by only 1 layer of air holes and are symmetrically distributed with respect to the y-axis. Each cladding defect contains one central air hole centered on the x-axis and the other six air holes surrounding it. The six air holes' diameter has the same value and is smaller than the cladding air holes' diameter. There are 2 cladding defects along the y-axis. Their centers are respectively located on the y-axis, which is also the perpendicular bisector of the top and bottom edges of the fourth hexagonal air hole ring. Hence, the centers of each cladding defect on the y-axis go through from the core by 3 layers of air holes, and they are symmetrically distributed with respect to the x-axis. Each cladding defect contains 1 air hole, whose diameter is smaller than the diameters of all the air holes in the cladding defect along the x-axis.

As stated in (1), this method to form the cladding defects increases the birefringence of the fiber core. It makes the refractive index value of the x-polarized mode higher than that of the y-polarized mode. This further increases the difficulty to match the refractive index between the cladding defect modes and the core polarized modes. However, the method to form the cladding defects in this invention has the ability to self-counterbalance that disadvantage at the same time. Specifically, each cladding defect along the x-axis contains 7 smaller air holes and the cladding defect along the y-axis contains only 1 smaller air hole. The area of the cladding defect along the x-axis is about 7 times as large as the area of the cladding defect along the y-axis. This makes the refractive index value of the cladding defect mode along the x-axis much higher than that of the cladding defect mode along the y-axis. Therefore, under these cladding defects structures and their combined actions, it not only has the effect of increasing the birefringence of the fiber core to make the refractive index value of the x-polarized mode higher than that of the y-polarized mode, but also can significantly increase the refractive index difference between the cladding defect modes along the x-axis and y-axis to make the refractive index value of the cladding defect mode along the x-axis higher than that along the y-axis. Besides, because the centers of each x-axis cladding defect are respectively located at the two vertices of the fourth hexagonal air-hole ring on the x-axis and each cladding defect along the x-axis goes through from the core by only 1 layer of air holes, the technical scheme of increasing the diameter of this air holes in the first layer surrounding the core to be larger than that in the cladding reduces both the area of the fiber core and cladding defects along the x-axis. These core area reductions in turn reduce the refractive index values for all the x-polarized core mode, y-polarized core mode, and the defect modes in the cladding defects along the x-axis. The fiber core is influenced by all the 10 air holes in the first layer surrounding the core, while the cladding defects along the x-axis is only influenced by one air hole in the first layer surrounding the core. The technical effect of reducing the refractive index values of the x- and y-polarized modes of the core is greater. Moreover, to increase the diameter of the air holes in the cladding or the distance between adjacent air holes reduces the area of the cladding defects along the x-axis and y-axis, which in turn decreases refractive index values in the cladding defect modes along the x-axis and y-axis and vice versa. By the combination actions of all the above technical schemes, the technical effect that the refractive index of the cladding defect mode along the x- and y-axis respectively matches with that of the x- and y-polarized core mode at similar wavelength is achieved. This guarantees the x- and y-polarized core modes resonate, or couple strongly between the corresponding defects modes in the cladding defects along the x-axis and y-axis around the same wavelength.

(3) The slopes of the refractive index to wavelength curves of the cladding defects modes along x-axis and y-axis are respectively mismatched with that of the x-polarized and y-polarized core modes at around their refractive indices matched wavelengths.

The goal of the invention is to generate a negative dispersion with large absolute value by creating an abrupt change on the refractive index values of the x- and y-polarized core modes at the resonance point and its nearby wavelengths. To achieve this goal, in addition to solve the technical problem stated in (1) and (2), it is necessary to make the refractive index to wavelength curves of the x-polarized and y-polarized core modes diverge quickly from the refractive index to wavelength curves of the cladding defects modes along x-axis and y-axis, respectively. The quick divergence between two refractive index curves further reduces the energy coupling strength between the core and the cladding defects modes sharply. Therefore, the absolute value of the slope of the refractive index to the red-shift of wavelength curve for the cladding defects mode along x-axis is smaller than that for the x-polarized core mode (in other words, the slopes of these two curves should be mismatched.). This is also true for the cladding defects mode along y-axis and the y-polarized core mode.

To fulfill those requirements, several technical schemes are used in this invention. Retain but shrink the air holes in the cladding defects along the x- and y-directions to reduce the upper limit of the refractive indices of the cladding defects modes. Set the diameter of the air holes in the cladding be smaller than the diameter of the air holes in the first layer surrounding the core to raise the lower limit of the refractive indices of the cladding defects modes. Both technical schemes reduce the absolute value of the slope of the refractive index to the red-shift of wavelength curve for the cladding defects modes along the x-axis and y-axis. Meanwhile, construct 2 cladding defects along the x-axis with identical structure and symmetrically distributed with respect to the y-axis. Each of them contains 7 smaller air holes and goes through from the core by only 1 layer of air holes. These technical schemes increase the average refractive index of the porous structure surround the fiber core along x direction, then reduce the absolute value of the slope of the refractive index to the red-shift of wavelength curve of the x-polarized core mode. Construct 2 cladding defects along the y-axis with identical structure and symmetrically distributed with respect to the x-axis. However, each of them contains only 1 smaller air holes and the shortest path from each of them to the core goes through at least 3 layers of air holes. As a result, these technical schemes have little effects on the absolute value of the slope of the refractive index to the red-shift of wavelength curve of the y-polarized mode of the fiber core.

Under the joint action of the above technical schemes and those technical schemes in (1) that affect the slope of the refractive index curves of the core modes, the technical effect that the absolute value of the slope of the refractive index to the red-shift of wavelength curve for the x-polarized mode is smaller than that for the y-polarized mode is further enhanced. The fiber core and the cladding defects are surrounded by porous structure with lots of air holes. The average refractive index of the porous structure is the lower limit for both of the refractive indices of the core modes and the cladding defects modes. So, the initial lower limit of the refractive indices of the core modes equals to that of the cladding defects modes. Then, the technical scheme of increasing the diameter of the air holes in the first layer surrounding the fiber core to be larger than the diameter of the air holes in the cladding is used. This technical scheme reduces the average refractive index of the air holes in the first layer surrounding the fiber core and their surrounding pure silica glass substrate, which further reduces the lower limit of the refractive indices of the two polarized core modes. Because the centers of x-axis cladding defect are respectively located at the two vertices of the fourth hexagonal air-hole ring on the x-axis and each cladding defect along the x-axis goes through from the core by only 1 layer of air holes, the technical scheme of increasing the diameter of the first layer of air holes surrounding the fiber core also reduces the lower limit of the refractive indices in the cladding defects modes along the x-axis. In addition, it makes the absolute value of the slope of the refractive index to the red-shift of wavelength curves for all the core modes and the cladding defects mode along x-axis increases. However, the fiber core is influenced by 10 air holes, while the cladding defects along the x-axis is influenced by only one air hole. The absolute value of the slope of the refractive index to the red-shift of wavelength curve for the x- and y-polarized core modes has a larger increase than that of the cladding defects modes along the x-axis. Under the joint action of the above technical schemes, not only the huge difference between the slopes of the refractive index to the red-shift of wavelength curves for the x- and y-polarized core modes remains, but also the slopes of the refractive index to wavelength curves of the cladding defects modes along x-axis and y-axis are respectively mismatched with that of the x- and y-polarized core modes at around the refractive indices matched wavelengths.

(4) Balance the value of the large negative dispersion at the resonant wavelength for the x- and y-polarized core modes.

The technical schemes described in (3) can achieve the technical effect that the slopes of the refractive index to wavelength curves of the cladding defects modes along x-axis and y-axis are respectively mismatched with that of the x- and y-polarized core modes at around the refractive indices matched wavelengths. However, because the absolute value of the slope of the refractive index to the red-shift of wavelength curve for the x-polarized core mode becomes much smaller than that for the y-polarized core mode, the following new technical problems are still existed. At the resonance wavelength, there is a divergence between the slopes of the refractive index to the red-shift of wavelength curves for the x-polarized core modes and the cladding defects modes along x-axis (this difference is also denoted as the slope mismatch), and a divergence between the slopes of the refractive index to the red-shift of wavelength curves for the y-polarized core modes and the cladding defects modes along y-axis. The value of these two divergences has a huge difference. In addition, the area of the cladding defect along the x-axis is about 7 times as large as the area of the cladding defect along the y-axis. This makes the coupling strength between the x-polarized core mode and the cladding defect mode along the x-axis and the coupling strength between the y-polarized core mode and the cladding defect mode along the y-axis different. The above technical schemes cause a disadvantage that the negative dispersion values of the x- and y-polarized core modes have a large difference at the resonance wavelength Fortunately, this invention has the ability to counterbalance that disadvantage by itself to balance the value of the large negative dispersion at the resonant wavelength for the x- and y-polarized core modes. The specific schemes and the mechanism behind them are stated as follows. The area of the cladding defect along the x-axis is about 7 times as large as the area of the cladding defect along the y-axis. The diameter of the air holes in the cladding defects along the x-axis is larger than that along the y-axis. Both technical schemes make the absolute value of the slope of the refractive index to the red-shift of wavelength curve for the cladding defects modes along the x-axis smaller than that along the y-axis. This makes the difference between the slopes of the refractive index to the red-shift of wavelength curves for the x-polarized core modes and the cladding defects modes along the x-axis be close to that for the y-polarized core modes and the cladding defects modes along the y-axis (In other words, the difference between the two slope differences is matched.). By this way, the coupling strength between x-polarized core mode and cladding defects mode along the x-axis is adjusted to be equal to the coupling strength between y-polarized core mode and cladding defects mode along the y-axis. As a result, the values of the large negative dispersion are balanced for the x- and y-polarized core modes at the resonant wavelength. The area of the cladding defect along the x-axis is about 7 times as large as the area of the cladding defect along the y-axis. This technical scheme makes the coupling strength between the cladding defects mode along the x-axis and the x-polarized core mode weaker than that of the cladding defects mode along the y-axis and the y-polarized core mode. The centers of each x-axis cladding defect are respectively located at the two vertices of the fourth hexagonal air-hole ring on the x-axis. Because the cladding defects along the y-axis is constructed to be perpendicular to the cladding defects on the x-axis, its center must be located on the y-axis, which is also the perpendicular bisector of the top and bottom edges of the fourth hexagonal air-hole ring. Under this limitation, each cladding defect along the x-axis and the core go through by only 1 layer of air holes, which means they are close to each other. However, the shortest path from the cladding defect along the y-axis to the core goes through 3 layers of air holes, which means the cladding defect along the y-axis is far from the fiber core. Hence, the distance from the cladding defects to the core is different. This difference further makes the coupling strength between the cladding defects modes along the x-axis and the x-polarized core mode be stronger than that of the cladding defects modes along the y-axis and the y-polarized core mode. Some cladding air holes are located between the cladding defect along the y-axis and the fiber core. Increasing their diameter reduces the coupling strength between the cladding defects modes along the y-axis and the y-polarized core mode, and vice versa. By the combination actions of all the above technical schemes, the technical effect that equalizing the value of the large negative dispersion of the x- and y-polarized core modes is achieved at the resonant wavelength.

To solve the above technical problems, the technical schemes of this invention are as follows:

This invention is about a single core polarization maintaining dispersion compensation microstructure fiber. It uses pure silica glass as the background material, and consists of five parts: the fiber core, the first layer of air holes surrounding the fiber core, the cladding defects on the x-axis, the cladding defects on the y-axis, and the cladding.

The air holes in the fiber cross section are arranged in the equilateral triangle lattice, with the adjacent air holes spacing $\wedge$. Three consecutive air holes are omitted along one of the edges of the hexagon to form a solid area. The solid area is the fiber core. The first layer of air holes surrounding the fiber core contains 10 air holes with a diameter of $d1$. There are two cladding defects along the x-axis with identical structure and symmetrically distributed with respect to the y-axis. The centers of the x-axis cladding defects are respectively located at two vertices of the hexagonal air-hole ring on the x-axis. Each cladding defect along the x-axis contains 1 air hole centered on the x-axis and 6 air holes surrounding the 1 air hole, and is spaced from the fiber core by only 1 layer of air holes. The diameter of the 7 air holes is $d3$. There are 2 cladding defects along the y-axis with identical structure and symmetrically distributed with respect to the x-axis. The centers of the y-axis cladding defects are respectively located on the y-axis and also located on the perpendicular bisector of the top and bottom edges of the hexagon. The centers of the cladding defects along the y-axis are spaced from the fiber core by 3 layers of air holes. Each cladding defect along the y-axis contains 1 air hole with a diameter of $d4$. The diameter of all the air holes in the cladding is $d2$. The above mentioned four diameters satisfy the relationship of $d1>d2>d3>d4$.

Further, the adjacent air hole spacing $\wedge$ is in a range of 1.64-1.66 μm.

Further, the diameter $d1$ of the air holes in the first layer surrounding the fiber core is in a range of 1.465-1.485 μm.

Further, the diameter $d3$ of the air holes in the cladding defects on the x-axis is in a range of 0.632-0.652 μm.

Further, the diameter $d4$ of the air hole in the cladding defects on the y-axis is in a range of 0.339-0.359 μm.

Further, the diameter $d2$ of the air holes in the cladding is in a range of 0.914-0.934 μm.

Compared with the existing technology, the single core polarization maintaining dispersion compensation microstructure fiber proposed by this invention has the following advantages. (1) In this invention, the fiber core and the cladding defect (core) work together to increases the birefringence of the fiber core. This invention omits 3 consecutive air holes on the x-axis, increases $d1$ of the air holes in the first layer surrounding the core, reduces the distance $\wedge$ between adjacent air holes, and constructs the quasi-rectangular fiber core with C2v symmetry. Under the joint action of the above technical schemes, the refractive index value of the x-polarized mode is much higher than that of the y-polarized core mode. This generates a birefringence with slow axis along x direction and fast axis along y direction. At the same time, this invention constructs 2 cladding defects along the x-axis and 2 cladding defects along the y-axis, which are symmetrically distributed with respect to the y-axis and x-axis, respectively. Because the cladding defects act as part of the porous structure surrounding the core, this method to construct cladding defects make the MSF has a structural symmetry of C2v. On this basis, each cladding defect along the x-axis contains 7 air holes and goes through from the core by only 1 layer of air holes. This technical scheme increases the average refractive index of the porous structure surround the fiber core along x direction. It further increases the refractive index value of the x-polarized core mode, which results in a higher birefringence in the fiber core. (2) This invention's technical schemes along x direction simultaneously adjust the refractive index values of the x-polarized core mode and the cladding defect modes along the x-axis to make them match with each other. Each cladding defect along the x-axis of the invention contains 7 air holes. Those air holes act as the core of the cladding defects along the x-axis, as well as a part of the porous structure surrounding the fiber core. In this invention, $d3$ of those 7 air holes is set to be smaller than $d2$ of the air holes in the cladding. This technical scheme increases both the refractive index values of the x-polarized core mode and the cladding defect mode along the x-axis. However, the refractive index value of the cladding defect mode along the x-axis has a larger increase compared to that of the x-polarized core mode. The air holes in the first air-hole layer surrounding the fiber core act as a part of the porous structure surrounding the fiber core. Some of them also act as part of the porous structure surrounding the cladding defects along the x-axis. In this invention, $d1$ is set to be larger than $d2$. This technical scheme reduces both the refractive index values of the x-polarized core mode and the cladding defect mode along the x-axis. However, the refractive index value of the x-polarized core mode has a larger decrease compared to that of the cladding defect mode along the x-axis. Under the joint action of the above technical schemes, the technical effect that the refractive index of the cladding defect mode along the x-axis equals (matches) to that of the x-polarized core mode is achieved at working wavelength. (3) The overall structure scheme of the invention has the ability to balances the value of the large negative dispersion of the x- and y-polarized core modes at the resonant wavelength. The 2 cladding defects along the x-axis have identical structure and are symmetrically distributed with respect to the y-axis, and each of them retains but shrinks the 7 air holes with a diameter of d3. Those 7 air holes are part of the cladding defect core along the x-axis, as well as part of the porous structure surrounding the fiber core. This technical scheme simultaneously reduces the absolute value of the slope of the refractive index to the red-shift of wavelength curve for both the x-polarized core mode and the cladding defect mode along the x-axis, but the impacts on that of the cladding defect mode along the x-axis is greater. The 2 cladding defects along the y-axis have identical structure and are symmetrically distributed with respect to the x-axis, and each of them contains only 1 smaller air hole. Hence, the area of the x-axis cladding defect is about 7 times as large as the area of the cladding defect along the y-axis. In addition, d3 of the air holes in the cladding defects along the x-axis is adjusted to be larger than d4 of the air holes in the cladding defects along the y-axis. Both technical schemes make the absolute value of the slope of the refractive index to the red-shift of wavelength curve for the cladding defects modes along the x-axis smaller than that along the y-axis. The above technical schemes, together with the technical schemes related to the fast and slow axes of the fiber core, finally achieve the technical effect that the difference between the slopes of the refractive index to the red-shift of wavelength curves for the x-polarized core modes and the cladding defects modes along the x-axis is close to that for the y-polarized core modes and the cladding defects modes along the y-axis. On this basis, each cladding defect along the x-axis retains but shrinks 7 smaller air holes. And the centers of x-axis cladding defects are respectively located at the two vertices of the fourth hexagonal air-hole ring on the x-axis, so each cladding defect along the x-axis goes through from the core by only 1 layer of air holes. The large area of the x-axis cladding defect leads to weak coupling between its mode and the x-polarized core mode. However, the close distance from x-axis cladding defect to the fiber core leads to strong coupling between its mode and the x-polarized core mode. Because the cladding defects along the y-axis is constructed to be perpendicular to the cladding defects on the x-axis, its center must be located on the y-axis, which is also the perpendicular bisector of the top and bottom edges of the hexagonal air-hole ring. Under this limitation, the shortest path from the cladding defect along the y-axis to the core goes through 3 layers of air holes. Each cladding defect along the y-axis retains but shrinks 1 smaller air hole. The small area of the y-axis cladding defect leads to strong coupling between its mode and the x-polarized core mode. However, the farther distance from x-axis cladding defect to the fiber core leads to weak coupling between its modes to the x-polarized core mode. By the combination actions of all the above technical schemes, the technical effect that equalizing the value of the large negative dispersion of the x- and y-polarized core modes is achieved at the resonant wavelength. In conclusion, this invention not only generates a high birefringence in the fiber core, but also equalizes the value of the large negative dispersion for the x- and y-polarized core modes at the resonant wavelength. If applied to the optical fiber communication system, the invented MSF has the ability to maintain the linear polarized state of the optical signal, as well as evenly compensate the positive dispersion of the optical signal accumulated during the transmission in the front-end optical fiber.

By all the technical schemes proposed in this invention, an example is presented below. The birefringence between the x- and y-polarized core modes is $8.04 \times 10^{-3}$ at 1550 nm. The dispersion value of the x-polarized core mode is $-2070/$(nm km) at 1550 nm, the dispersion value of the y-polarized core mode is $-2298$ ps/(nm km) at 1550 nm.

DETAILED DESCRIPTION OF PREFERRED EMBODIMENTS

To better illustrate the technical schemes of the embodiments and related technical schemes, the diagrams in the section of the embodiments and the technical schemes' description are explained below. Obviously, the designs presented in the following section are merely some examples of this invention. Other designs can be obtained without creative efforts from these drawings for the practitioners in the field.

Figure 1:
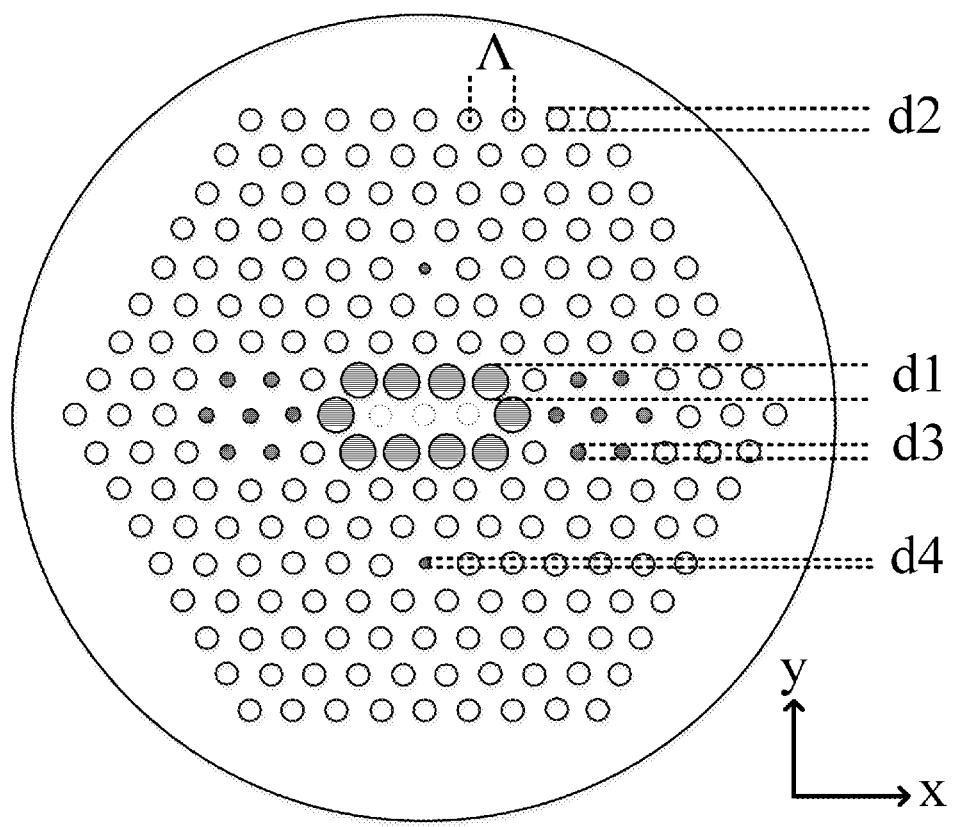
FIG. 1 shows a cross-sectional diagram of an optical fiber according to one embodiment of the disclosure.

The detailed structures of an example about the invented single core polarization maintaining dispersion compensation MSF are presented in FIG. 1. It uses pure silica glass as the background material, and consists of five parts: the fiber core, the first layer of air holes surrounding the fiber core, the cladding defects on the x-axis, the cladding defects on the y-axis, and the cladding. The air holes in the fiber cross section are arranged in an equilateral triangle lattice, with the adjacent air holes spacing $\wedge$ in the range of 1.64-1.66 μm. In this example, $\wedge=1.65$ μm. Three consecutive air holes are omitted along one of the edges of the hexagon to form a solid area. The solid area is the fiber core. The center of one of the three omitted air holes which is located in a middle of the three omitted air holes is defined as a coordinate original point; an axis connecting centers of the three omitted air holes is defined as the x-axis; an axis passing through the original point and perpendicular to the x-axis is defined as the y-axis. The first layer of air holes surrounding the fiber core contains 10 air holes, with a diameter d1 in the range of 1.465-1.485 μm. In this example, d1=1.475 μm. The two cladding defects along the x-axis have identical structure and symmetrically distributed with respect to the y-axis. The centers of the x-axis cladding defects are respectively located at two vertices of the hexagonal air-hole ring on the x-axis. Each cladding defect along the x-axis contains 1 air hole centered on the x-axis and 6 air holes surrounding the 1 air hole, and is spaced from the fiber core by only 1 layer of air holes. The diameter of the 7 air holes is d3 in the range of 0.632-0.652 μm, and in this example d3=0.642 μm. The 2 cladding defects along the y-axis have identical structure and symmetrically distributed with respect to the x-axis. The centers of the y-axis cladding defects are respectively located on the y-axis and also located on the perpendicular bisector of the top and bottom edges of the hexagon. The centers of the cladding defects along the y-axis are spaced from the fiber core by 3 layers of air holes. Each of the cladding defects along the y-axis contains 1 air hole, with the diameter d4 in the range of 0.339-0.359 µm. In this example d4=0.349 µm. The diameter of the air holes in the cladding is d2 in the range of 0.914-0.934 µm, and in this example d2=0.924 µm. The above mentioned four diameters satisfy the relationship of d1>d2>d3>d4.

The specific technical scheme of this patent can be described as:

The invented fiber uses pure silica glass as the background material. The adjacent air holes in the fiber cross section are arranged in the equilateral triangle lattice, with the air-hole to air-hole spacing $\wedge$. Hence, all of the air holes are arranged in regular hexagonal lattice with a symmetry of C6v. The fiber structure with C6v symmetry itself does not generate birefringence in the core modes.

This invention omits 3 consecutive air holes on the x-axis. The above technical scheme has the following effects. A solid area is formed to act as the fiber core, which has the quasi-rectangular shape and surrounded by the first layer of air holes. The size of the fiber core along the x and y directions are determined by three technical schemes: the direction and number of the omitted consecutive air holes (This invention omits 3 consecutive air holes on the x-axis); d1 of the first layer of air holes surrounding the fiber core; the adjacent air holes spacing $\wedge$. More specifically, the length of the quasi-rectangular core along x direction, which is its long side's length, is $4\wedge - d1$. The length of the fiber core along y direction, which is its short side's length, is $\sqrt{3}\wedge - d1$. These technical schemes to form the fiber core reduce the symmetry of the overall fiber from C6v to C2v. Because the side along x direction is longer than that along y direction, the refractive index value of the x-polarized core mode is higher than that of the y-polarized core mode. This generates a birefringence with slow axis along x direction and fast axis along y direction. It also makes the absolute value of the slope of the refractive index to the red-shift of wavelength curve for the x-polarized core mode smaller than that for the y-polarized core mode.

The diameter of the air holes in the first layer surrounding the fiber core is d1, and the distance between adjacent air holes is $\wedge$. The above technical schemes have the following effects. The air holes in the first air-hole layer surrounding the fiber core are parts of the porous structure surrounding the fiber core. The technical schemes of making d1 larger than d2 of the air holes in the cladding and reducing $\wedge$ have the following technical effects. Firstly, both the side lengths of the quasi-rectangular core along x- and y-directions are shortened. As a result, the refractive index values of the x- and y-polarized core modes are decreased. Secondly, the average refractive index of the air holes in the first layer surrounding the fiber core and their surrounding pure silica glass substrate is reduced. This leads to the reduction of the average refractive index of the porous structure surround the fiber core, which is the lower limit of the refractive indices of the x- and y-polarized core modes. As a result, the absolute value of the slope of the refractive index to the red-shift of wavelength curve of the x- and y-polarized core modes is increased. Thirdly, the length to width ratio of the fiber core, which is calculated by $$1 + \frac{4 - \sqrt{3}}{\sqrt{3} - \frac{d1}{\wedge}},$$

is increased. The refractive index value of the x-polarized core mode is already higher than that of the y-polarized core mode in our invention. To increase the length to width ratio of the fiber core makes their difference even larger, which means the birefringence of the fiber core is increased. Besides, the absolute value of the slope of the refractive index to the red-shift of wavelength curve for the x-polarized mode is already smaller than that for the y-polarized mode. To increase the length to width ratio of the fiber core also increase the difference.

The technical scheme of increasing d1 has additional effects. The centers of x-axis cladding defect are respectively located at the two vertices of the fourth hexagonal air-hole ring on the x-axis and each cladding defect along the x-axis goes through from the core by only 1 layer of air holes. Because of this, some of the air holes in the first air-hole layer surrounding the fiber core also acts as part of the porous structure surrounding the cladding defects along the x-axis. Under these technical schemes, the cladding defect along the x-axis is influenced by only one air hole, while the fiber core is influenced by 10 air holes. To increase d1 brings the following technical effects. Firstly, it reduces the area of the cladding defects along the x-axis, which further decreases the refractive index values of the x-axis cladding defects modes. But the decrease is smaller compared to the decrease of the refractive index value of the x-polarized core mode caused by d1's increase. Secondly, it reduces the average refractive index of the porous structure surround the x-axis cladding defects, which also reduces the lower limit of the refractive indices in the cladding defects modes along the x-axis. This in turn increases the absolute value of the slope of the refractive index to the red-shift of wavelength curves for the cladding defects mode along x-axis. But the increase is smaller compared to the increases of the absolute value of the slope of the refractive index to the red-shift of wavelength curves for the x-polarized core mode caused by d1's increase The technical scheme of reducing the $\wedge$ also brings some additional effects. The area of the x-axis cladding defect is calculated as:

$$\frac{5\pi}{6}\frac{(4\wedge - d2)^2}{4} + \frac{\pi}{6}\frac{(4\wedge - d1)^2}{4},$$

and the area of the y-axis cladding defect is calculated as:

$$\frac{\pi(2\wedge - d2)^2}{4}.$$

Therefore, to reduce $\wedge$ reduces both the area of the cladding defect along the x and y axes. This further reduces both refractive indices of the cladding defects modes along the x and y axes.

The diameter of the air holes in the cladding is d2. The above technical scheme has the following effects. The porous cladding surrounds both the fiber core and the defects. Its average refractive index sets the lower limit for both of the refractive indices of the core modes and the cladding defects modes. Firstly, for a triangle arranged air-hole array, the average refractive index by the area ratio between the air holes and its surrounding silica glass background in a cell is:

$$\left[1 - \frac{\sqrt{3}\pi}{6}\left(\frac{d}{\Lambda}\right)^2\right]n_{silica} + \frac{\sqrt{3}\pi}{6}\left(\frac{d}{\Lambda}\right)^2 n_{air}$$

where $n_{silica}$ represents the refractive index of pure silica glass, $n_{air}$ represents the refractive index of air whose value is 1.0; d is the diameter of the air hole in the cell. From this formula, the technical scheme that d2 is smaller than d1 makes the average refractive index of the porous structure surround the cladding defects lager than that surround the fiber core. Then, the lower limit of the refractive indices of the cladding defects modes is larger than that of the core mode. This in turn makes the absolute values of the slope of the refractive index to the red-shift of wavelength curve for the cladding defects modes smaller than that for the core modes. Secondly, according to the formula for calculating the areas of cladding defects along the x and y axes in (3), the technical scheme of reducing d2 increases the area of the cladding defects along the x and y axes, which in turn increases the refractive index values of the cladding defect modes along the x-axis and y-axis, and vice versa. Thirdly, some cladding air holes are located between the cladding defect along the y-axis and the fiber core. The technical scheme of reducing d2 increases the coupling strength between the cladding defects modes along the y-axis and the y-polarized core mode, and vice versa.

This invention constructs 2 cladding defects along the x-axis, which are symmetrically distributed with respect to the y-axis. Each cladding defect contains 1 central air hole whose center locates on the x-axis and the other 6 air holes surrounding it. Their diameter d3 is smaller than d2. The centers of the two x-axis cladding defects are respectively located at the two vertices of the fourth hexagonal air-hole ring on the x-axis. Both cladding defects go through from the core by only 1 layer of air holes. The above technical schemes have the following effects. Firstly, the average refractive index of the x-axis cladding defects is:

$$\left[1 - 7\left(\frac{d3}{4\Lambda - d2}\right)^2\right]n_{silica} + 7\left(\frac{d3}{4\Lambda - d2}\right)^2 n_{air}.$$

From this formula, after d3 is set to be smaller than d2, the average refractive index of the x-axis cladding defects is higher than that of the cladding. This makes some of the lights be totally reflected at the interface between the x-axis cladding defect and the cladding. These lights further develop into a certain guiding mode and transmit along the cladding defect. Secondly, the x-axis cladding defect is constructed by retaining but shrinking the air holes. This makes the average refractive index of the x-axis cladding defects lower than the refractive index $n_{silica}$ of the core. This in turn reduces the upper limit of the refractive indices of the x-axis cladding defects. As a result, the absolute value of the slope of the refractive index to the red-shift of wavelength curve for the cladding defects modes along the x-axis is reduced. Thirdly, the 7 air holes with a diameter of d3 as a whole act as the core of the cladding defects along the x-axis. This increases the area of the x-axis cladding defects, which makes the light energy more tightly confined in the x-axis cladding defects. This further increases the refractive index values of the cladding defect modes along the x-axis, while reduces the absolute value of the slope of the refractive index to the red-shift of wavelength curve for the cladding defects modes along the x-axis. As a result, the coupling strength between the cladding defects modes along the x-axis and the x-polarized core mode is weakened. Fourthly, because the centers of the two x-axis cladding defects are respectively located at the two vertices of the fourth hexagonal air-hole ring on the x-axis, both defects go through from the core by only 1 layer of air holes. This reduces the distance from the x-axis cladding defect to the fiber core, which leads to stronger coupling between the x-axis cladding defect mode and the x-polarized core mode.

Besides, because the 2 cladding defects along the x-axis has identical structure and distributes symmetrically with respect to the y-axis, it makes the MSF has a structural symmetry of C2v. The centers of each x-axis cladding defect are respectively located at the two vertices of the fourth hexagonal air-hole ring on the x-axis. Each cladding defect along the x-axis goes through from the core by only 1 layer of air holes. Each x-axis cladding defect contains 7 air holes, with their diameter d3 smaller than d2. Those air holes also act as part of the porous structure surrounding the core. These above technical schemes to construct 2 symmetrically distributed cladding defects along the x-axis have the following effects. Firstly, it increases the average refractive index of the porous structure surround the fiber core along x direction. This further increases the refractive index value of the x-polarized core mode. Secondly, this raises the lower limit of the refractive indices of the x-polarized core mode. As a result, the absolute value of the slope of the refractive index to the red-shift of wavelength curve for the x-polarized core mode is reduced.

This invention constructs 2 cladding defects along the y-axis, which are symmetrically distributed with respect to the x-axis. Each cladding defect along the y-axis contains 1 air hole, whose diameter d4 is smaller than d3. Their centers are respectively located on the y-axis, which is also the perpendicular bisector of the top and bottom edges of the hexagon that is formed by the fourth air hole ring from the core exclusive the central air hole. Hence, the shortest path from each of them to the core goes through at least 3 layers of air holes. The above technical schemes have the following effects. Firstly, d4 is smaller than d3, and it is also smaller than d2 deduced from (5). The average refractive index of the y-axis cladding defects is:

$$\left[1 - \left(\frac{d4}{2\Lambda - d2}\right)^2\right]n_{silica} + \left(\frac{d4}{2\Lambda - d2}\right)^2 n_{air}.$$

From this formula, the average refractive index of the y-axis cladding defects is higher than that of the cladding, because d4 is smaller than d2. This makes some of the lights be totally reflected at the interface between the y-axis cladding defect and the cladding. These lights further develop into a certain guiding mode and transmit along the cladding defect. Secondly, the y-axis cladding defect is constructed by retaining but shrinking the air holes. This makes the average refractive index of the y-axis cladding defects lower than the refractive index of the core. This in turn reduces the upper limit of the refractive indices of the y-axis cladding defects. As a result, the absolute value of the slope of the refractive index to the red-shift of wavelength curve for the cladding defects modes along the y-axis is reduced. Moreover, according to the formula for calculating the average refractive index of the cladding defects along the x and y axes, the average refractive index of the y-axis cladding defects is higher than that of the x-axis cladding defects, because d4 is smaller than d3. Therefore, the upper limit of the refractive indices of the y-axis cladding defects modes is higher than that of the x-axis cladding defects modes. This makes the absolute value of the slope of the refractive index to the red-shift of wavelength curve for the y-axis cladding defects modes become much larger than that for the x-axis cladding defects modes. Thirdly, 1 air hole with a diameter of d4 acts as the core of the cladding defects along the y-axis. Its area is quite small, about ⅟7 of the area of the x-axis cladding defects. This weakens its ability to confine light. This further brings the following results. The refractive index value of the y-axis cladding defects modes is lower than that of the x-axis cladding defects modes. The absolute values of the slope of the refractive index to the red-shift of wavelength curve for the y-axis cladding defects modes is larger than that for the x-axis cladding defects modes. The coupling strength between the cladding defects modes along the y-axis and the y-polarized core mode is increased. Fourthly, because the cladding defects along the y-axis is constructed to be perpendicular to the cladding defects on the x-axis, its center is located on the y-axis. Y-axis is also the perpendicular bisector of the top and bottom edges of the fourth hexagonal air-hole ring. Under this limitation, the shortest path from the cladding defect along the y-axis to the core goes through 3 layers of air holes. This increases the distance from the y-axis cladding defect to the fiber core, which weakens the coupling strength between the y-axis cladding defect mode and the y-polarized core mode. The y-axis cladding defects also act as the porous structure surrounding the core. Because these 2 cladding defects along the y-axis have identical structure and symmetrically distributed with respect to the x-axis, they do not change the structural symmetry of the MSF, which is C2v. Besides, the 2 cladding defects along the y-axis also have little effects on the refractive indices and the slopes of curves of refractive index with wavelength of the y-polarized core mode.

Figure 2:
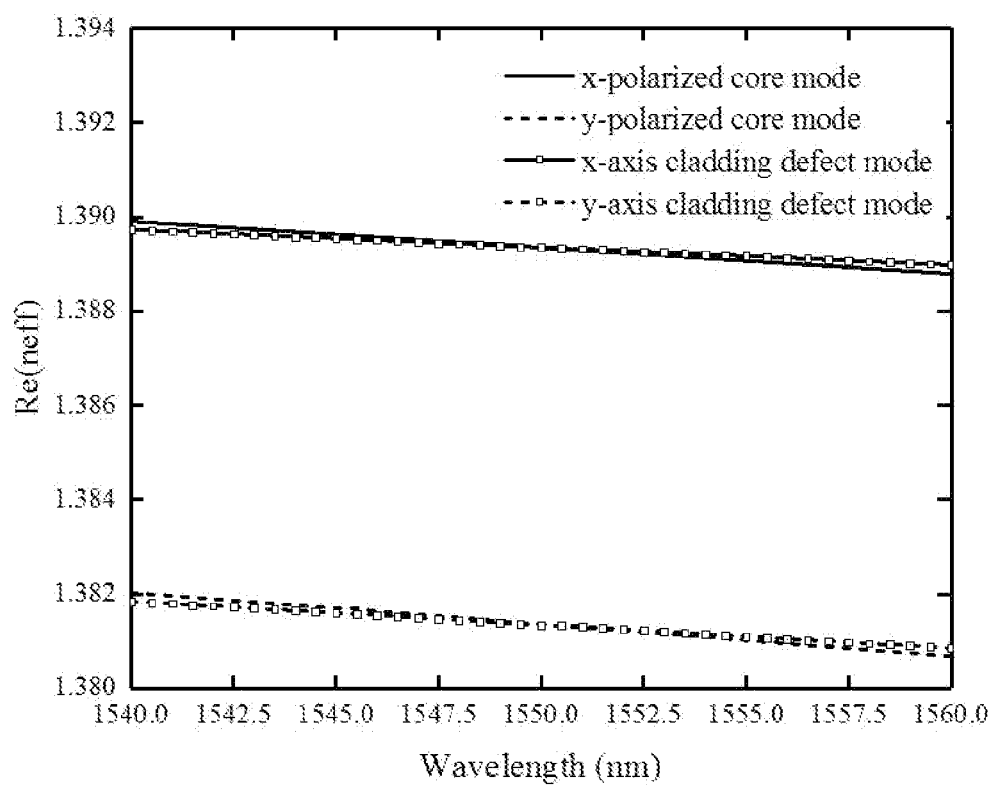
FIG. 2 shows a refractive index to the red-shift of wavelength curves for the core mode and the cladding defects mode according to one embodiment of the disclosure.

As shown in FIG. 2, the refractive index value of the x-polarized core mode is higher than that of the y-polarized core mode. Because the area of the cladding defect along the x-axis is about 7 times as large as the area of the cladding defect along the y-axis, the refractive index value of the cladding defect mode along the x-axis is much higher than that of the cladding defect mode along the y-axis. The above technical effects make the refractive index of the cladding defect mode along the x- and y-axis respectively matches with that of the x- and y-polarized core mode at similar wavelength.

Figure 3:
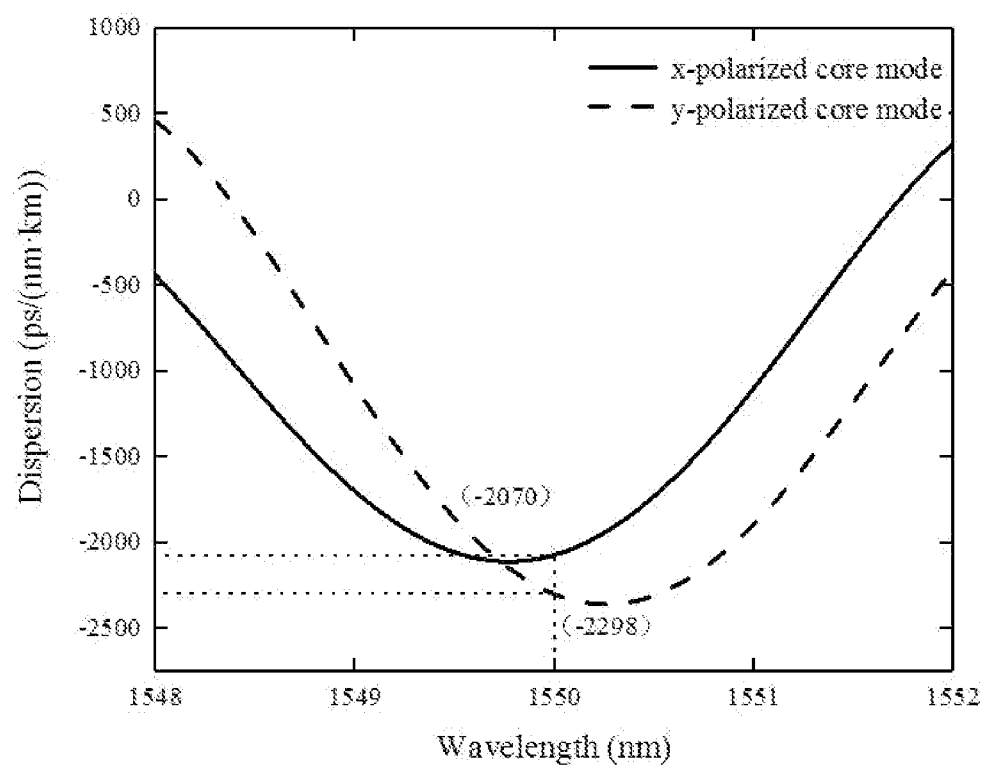
FIG. 3 shows the dispersion to the red-shift of wavelength curves for the x- and y-polarized core modes according to one embodiment of the disclosure.

The absolute value of the slope of the refractive index to the red-shift of wavelength curve for the x-polarized core mode is larger than that for the cladding defects mode along the x-axis, and this is also true for the y-polarized core mode and the cladding defects mode along the y-axis. This causes abrupt change on the refractive index values of the x- and y-polarized core modes around the resonance wavelength. This abrupt change in turn generates negative dispersion with large absolute value. In this invention, the difference between the slopes of the refractive index to the red-shift of wavelength curves for the x-polarized core modes and the cladding defects modes along the x-axis is close to that for the y-polarized core modes and the cladding defects modes along the y-axis. Besides, the x-axis cladding defects is constructed to be perpendicular to the y-axis cladding defects. Under the combination actions of these two technical schemes, the coupling strength between x-polarized core mode and cladding defects mode along the x-axis is adjusted to be equal to the coupling strength between y-polarized core mode and cladding defects mode along the y-axis. As a result, the values of the large negative dispersion are balanced for the x- and y-polarized core modes at the resonant wavelength. As shown in FIG. 3, the dispersion value of the x-polarized core mode is −2070/(nm·km) at 1550 nm, the dispersion value of the y-polarized core mode is −2298 ps/(nm·km) at 1550 nm.

Figure 4:
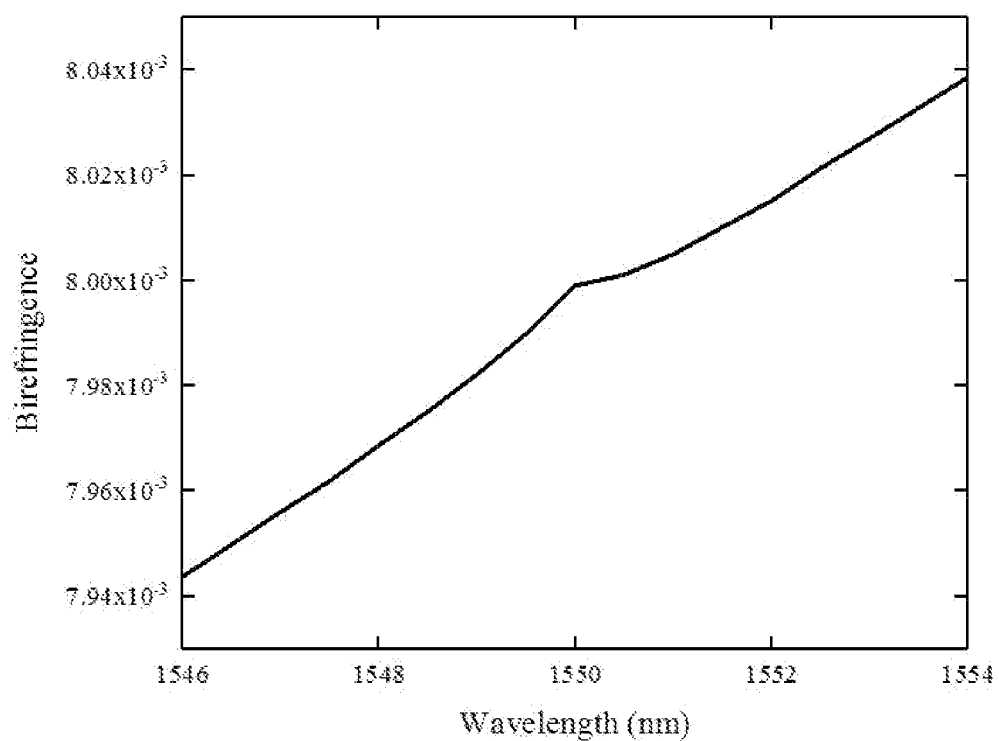
FIG. 4 shows the birefringence between the x- and y-polarized core modes to the red-shift of wavelength curve according to one embodiment of the disclosure.

The fiber core has a birefringence with slow axis along x direction and fast axis along y direction. The technical schemes of the cladding defects further increase the birefringence value of the fiber core. As shown in FIG. 4, the birefringence between the x- and y-polarized core modes is $8.04 \times 10^{-3}$ at 1550 nm.

The above-mentioned embodiments are merely descriptions of the preferred embodiments about this invention. They do not limit the scope of this invention. If the practitioners in the field make various changes and improvements to the technical schemes of this invention without departing from the design spirit of this invention, these changes and improvements still fall within the protection scope determined by the claims of this invention.

We claim:

1. A single core polarization maintaining dispersion compensation microstructure fiber, wherein the fiber comprises a pure silica glass used as a background material, a fiber core, a first layer of air holes surrounding the fiber core, cladding defects on an x-axis, cladding defects on a y-axis, and a cladding;

air holes in the fiber cross section are arranged in an equilateral triangle lattice, with an adjacent air holes spacing $\wedge$; three consecutive air holes are omitted along one of the edges of a hexagon to form a solid area; the solid area is the fiber core; a center of one of the three omitted air holes which is located in a middle of the three omitted air holes is defined as a coordinate original point; an axis connecting centers of the three omitted air holes is defined as the x-axis; an axis passing through the original point and perpendicular to the x-axis is defined as the y-axis; the first layer of air holes surrounding the fiber core contains 10 air holes with a diameter of d1; there are two cladding defects along the x-axis with identical structure and symmetrically distributed with respect to the y-axis; centers of the two cladding defects along the x-axis are respectively located at two vertices of a hexagonal air-hole ring on the x-axis; each cladding defect along the x-axis contains 1 air hole centered on the x-axis and 6 air holes surrounding the 1 air hole, and the centers of the cladding defect along the x-axis is spaced from the fiber core by only 1 layer of air holes; the diameter of the 1 air hole centered on the x-axis and 6 air holes surrounding the 1 air hole is d3; there are 2 cladding defects along the y-axis with identical structure and symmetrically distributed with respect to the x-axis; centers of the 2 cladding defects along the y-axis are respectively located on the y-axis and also located on the perpendicular bisector of the top and bottom edges of the hexagon; the centers of the cladding defects along the y-axis are spaced from the fiber core by 3 layers of air holes; each of the cladding defects along the y-axis contains 1 air hole with a diameter of d4; a diameter of the air holes in the cladding is d2; the above mentioned four diameters satisfy the relationship of d1>d2>d3>d4.

2. The fiber according to claim 1, wherein the adjacent air hole spacing $\wedge$ is in a range of 1.64-1.66 μm.

3. The fiber according to claim 1, wherein the diameter d1 of the air holes in the first layer surrounding the fiber core is in a range of 1.465-1.485 μm.

4. The fiber according to claim 1, wherein the diameter $d_3$ of the air holes in the cladding defects on the x-axis is in a range of 0.632-0.652 μm.

5. The fiber according to claim 1, wherein the diameter $d_4$ of the air holes in the cladding defects on the y-axis is in a range of 0.339-0.359 μm.

6. The fiber according to claim 1, wherein the diameter $d_2$ of the air holes in the cladding is in a range of 0.914-0.934 μm.

\* \* \* \* \*